Figure 1:
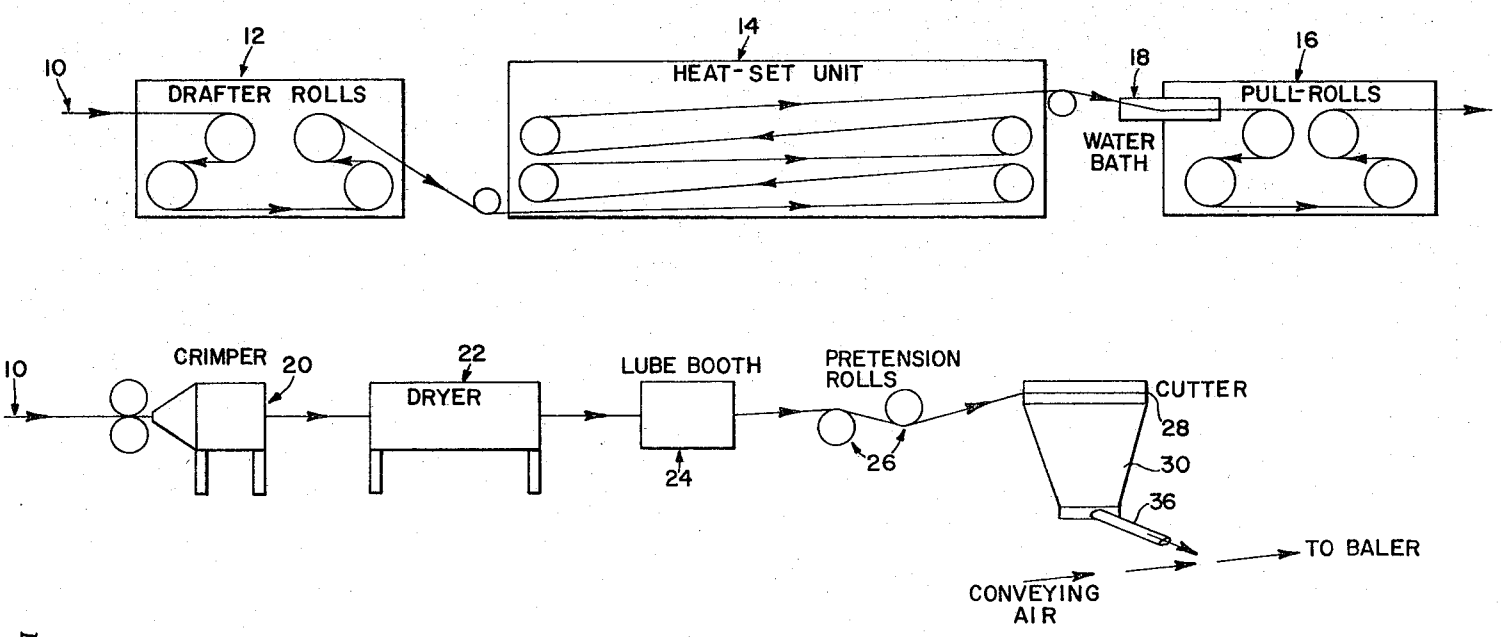
Figure 2:
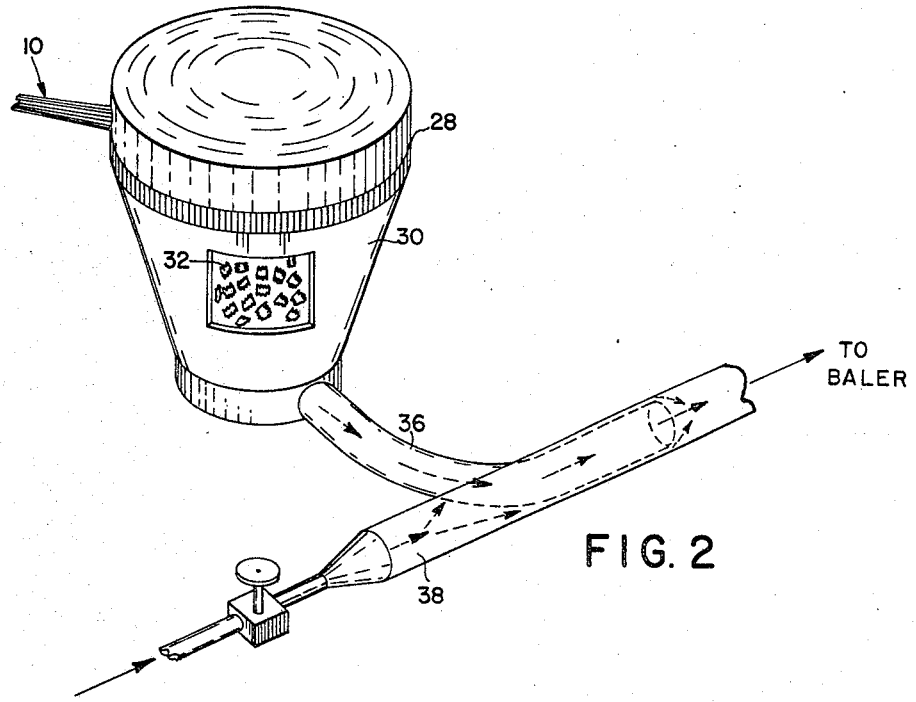
Figure 3:
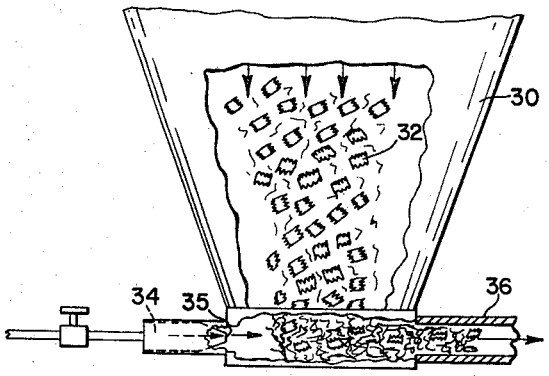
Figure 4:
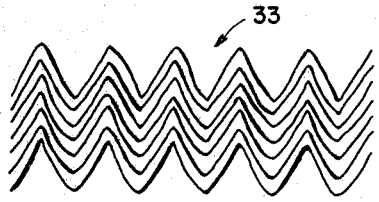
Figure 5:
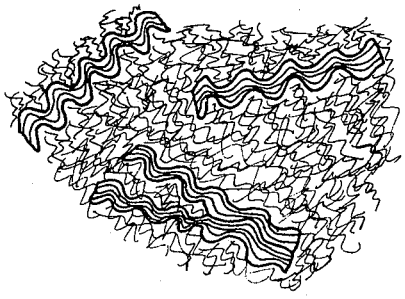
Figure 6:
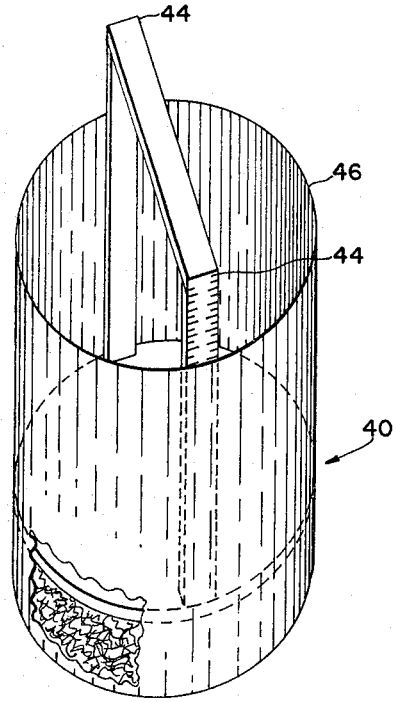
Figure 7:
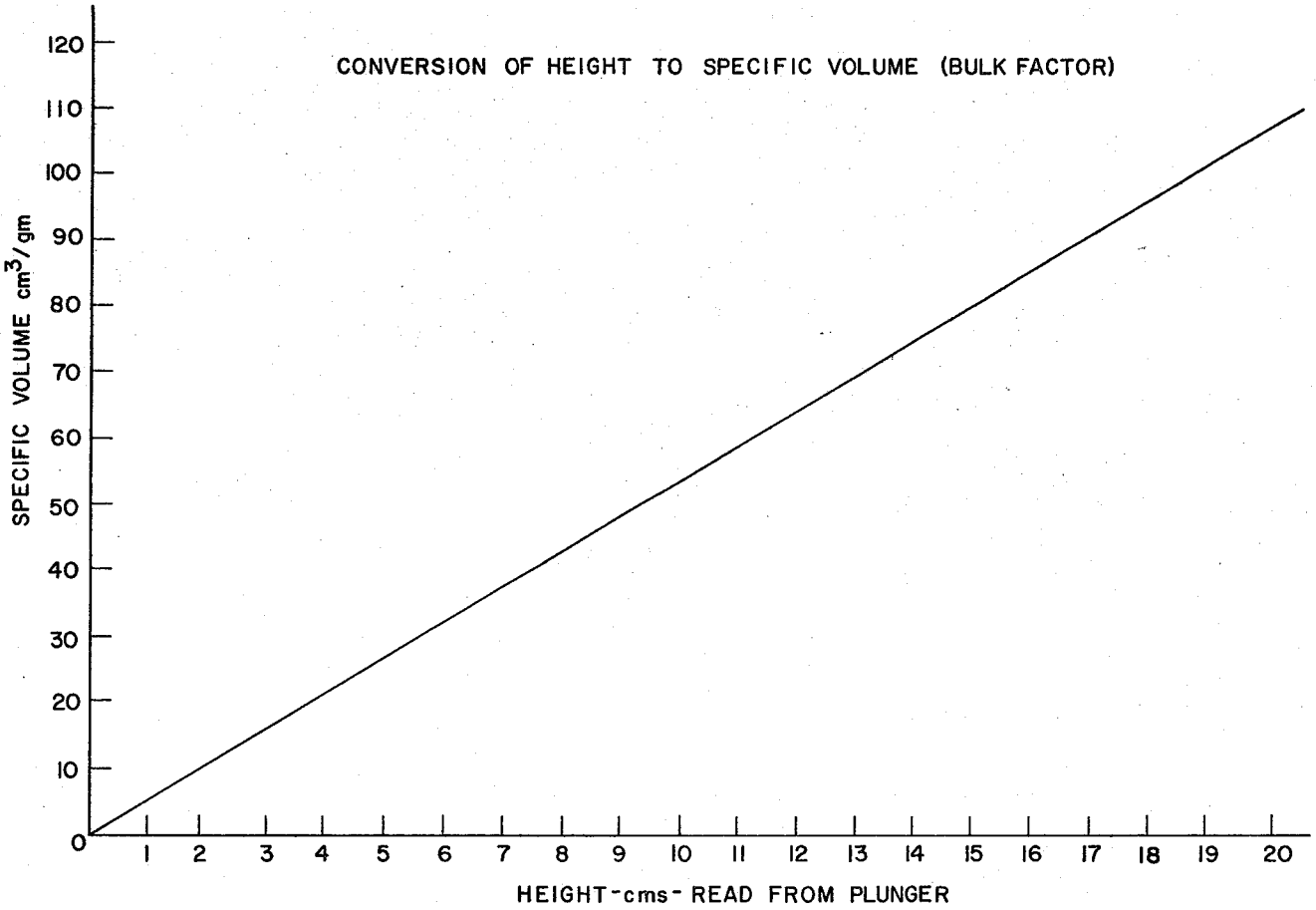

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 13, 1970

870 O.G. 393

T870,011

COMPOSITE SYNTHETIC STAPLE FIBER FOR USE IN TEXTILE MILLS AND METHOD AND APPARATUS FOR FORMING THE SAME

Theodore W. Glynn III, and George R. Stonecipher, both of P.O. Box 511, Kingsport, Tenn. 37662

Filed Apr. 16, 1968, Ser. No. 721,844
Int. Cl. D02g *3/22;* D01b *1/00*
U.S. Cl. 161—173
4 Sheets Drawing. 13 Pages Specification

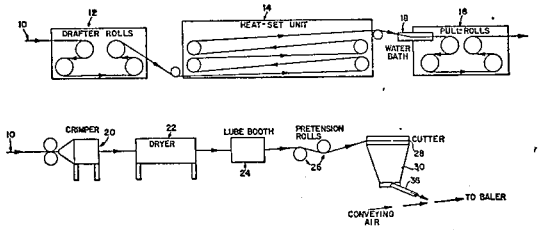

A high tenacity composite synthetic staple fiber consisting of chip, partially opened and opened stock having a bulk density per 127 gram sample within the range of about 35 to 50 cubic centimeters per gram by the bulk test, and the method and apparatus for producing such composite staple fiber. The method may include forming the staple fiber consisting of a composite of chip partially opened by heat setting a continuous length fiber band, rapidly quenching the band below the heat setting temperature of the fiber composition, crimping, drying and lubricating said band, pretensioning such band to an amount sufficient to extend the crimp therein but not sufficient to stretch the same, cutting the band while it is being pretensioned to form the staple fibers and conveying said staple fibers into a plenum chamber past a jet of low pressure gas. The apparatus for producing composite staple fiber from chip stock may include a plenum chamber having a jet device positioned therein wherein said device has a tapered nozzle and a slot in the end of the nozzle, means for conveying the chip stock in a path past said jet device and in front of said slot and means for delivering from said slot against said chip stock, a low pressure gas.

COMPOSITE SYNTHETIC STAPLE FIBER FOR USE IN TEXTILE MILLS
AND METHOD AND APPARATUS FOR FORMING THE SAME

Filed April 16, 1968 4 Sheets-Sheet 1

Theodore W. Glynn III
George R. Stonecipher
INVENTORS

BY William T. French
Malcolm G. Dunn
ATTORNEYS

Theodore W. Glynn III
George R. Stonecipher
INVENTORS

BY William T. French
Malcolm G. Dunn
ATTORNEYS

Theodore W. Glynn III
George R. Stonecipher
INVENTORS

BY William T. French
Malcolm H. Quinn
ATTORNEYS

Theodore W. Glynn III
George R. Stonecipher
INVENTORS

BY William T. French
Malcolm S. Dunn
ATTORNEYS